Sept. 24, 1968     E. D. BENNETT     3,402,623

METHOD OF MAKING A DIE SET

Filed July 18, 1966     2 Sheets—Sheet 1

INVENTOR
EDWARD D. BENNETT

BY Charles L. Johnson Jr.
ATTORNEY

Sept. 24, 1968         E. D. BENNETT         3,402,623
                METHOD OF MAKING A DIE SET
Filed July 18, 1966                    2 Sheets-Sheet 2

INVENTOR
EDWARD D. BENNETT

BY *Charles T. Johnson Jr*
ATTORNEY

United States Patent Office 3,402,623
Patented Sept. 24, 1968

3,402,623
METHOD OF MAKING A DIE SET
Edward D. Bennett, 1053 Coolidge Ave.,
Union, N.J. 07083
Filed July 18, 1966, Ser. No. 565,995
4 Claims. (Cl. 76—107)

ABSTRACT OF THE DISCLOSURE

A method of making a punching apparatus is provided in which a parallel plate die set is formed in which the assembled die is capable of having the cutting section formed in a prehardened steel one-piece die plate after the die set alignment is determined.

---

This invention relates generally to punching operations and more particularly to an apparatus for punching and the method of making the apparatus.

The art of punching material is old and many devices are known and used for accomplishing the punching operation. Many known devices are large and expensive to construct and require highly skilled labor to properly operate and maintain.

It is therefore a broad object of the invention to provide an improved method for making punching apparatus.

A more particular object of the invention is to provide an improved method of aligning a parallel plate die set.

It is a further object of the invention to provide an improved method for securing the guide pins in the punch plate of a parallel plate die set.

It is an important feature of the invention that a parallel plate die set is formed in which the assembled die set is capable of having the cutting die section formed in a prehardened steel one-piece die plate after the die set alignment is determined.

It is another feature of the invention that the guide pin openings in the die plate are used to align the guide pins for marking the punch plate for locating the position of openings for the guide pins in the punch plate.

It is a feature of the invention that the die plate including the guide pin openings is of one piece.

It is a further feature of the invention that the guide pins are secured in the punch plate by the distortion of punch plate material into an undercut collar in a guide pin and by the distortion of holding material into a groove in the guide pin.

These and other objects and features of the invention will become apparent from the following description when taken with the drawings which are hereby made a part of the application and in which.

Figure 5A:
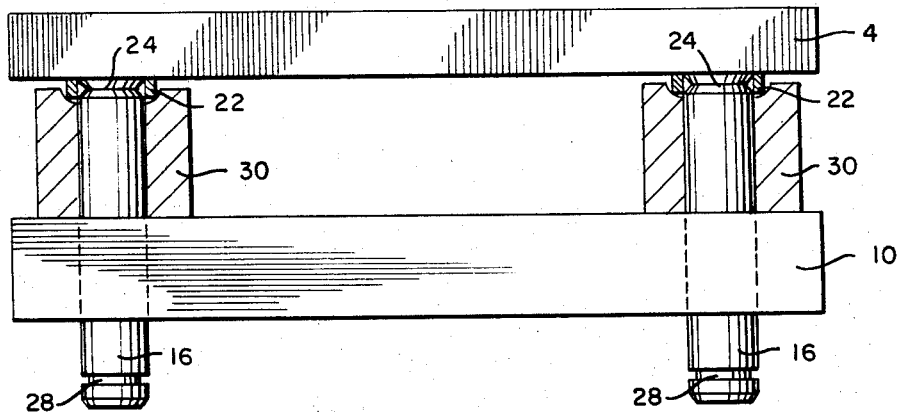
Figure 5B:
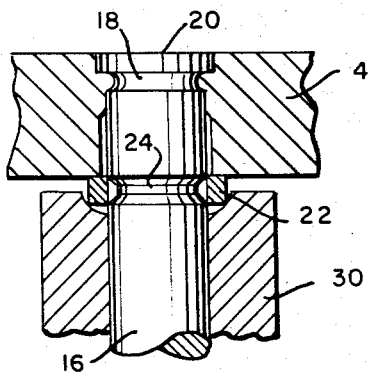
Figure 5C:
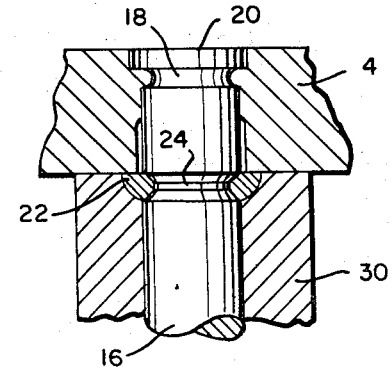

FIGS. 5a–c are partial cross-sectional views illustrating how the guide pins are secured to the punch plate.

The invention will now be described in detail by reference to the drawings in which like numerals are used to designate like members of the various figures.

The invention is directed to a method for making a punching die set in which a one-piece die plate of prehardened steel, having guide pin openings, is used to locate the positions on the punch plate where punch plate guide pin openings should be formed. The guide pins are secured to the punch plate at two areas. One area is concerned with an undercut portion of a guide pin collar into which punch plate material is forced and the second area relates to the forcing of a holding material into a groove in the guide pin.

Figure 1:
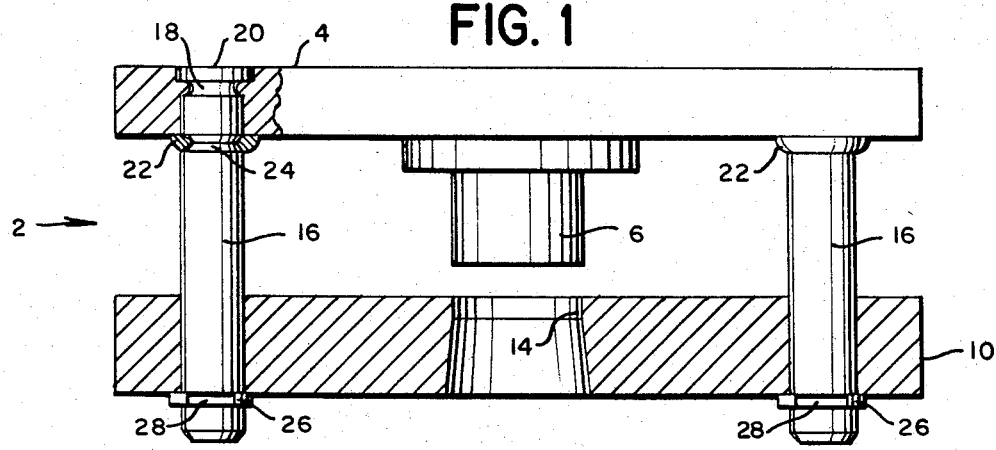
FIG. 1 is a partial cross-sectional view of the die set of the invention.

Referring now to FIG. 1, the parallel plate die 2 includes a punch plate 4 to which punch 6 is secured. A one-piece die plate 10 has guide pin openings 12 formed therein and is capable of having the cutting die section 14 formed therein either before or after assembly of the die set by guide pins 16.

As may be seen from FIGS. 1 and 5 the guide pins 16 are secured to the punch plate 4 at two areas. The first area is made up of punch plate material which flows into the undercut collar 18 of the guide pin 16 when the head 20 is forced down on the punch plate 4.

The second area is made up of malleable ring-shaped holding material 22, such as aluminum which is forced into the recess or groove 24. It is thus seen that the guide pins 16 are securely attached to the punch plate 4 at two different areas in two different ways.

Lock rings 26 fit in end grooves 28 of the guide pins 16 to prevent the punch and die plates from separating.

Figure 2:
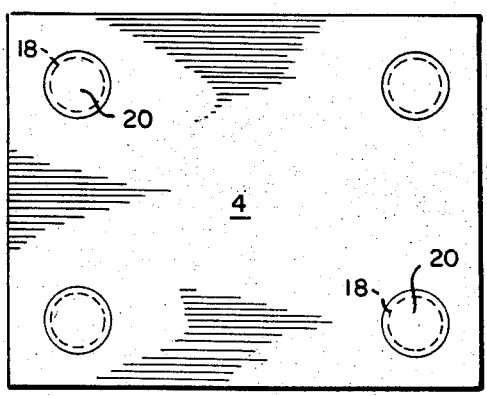
FIG. 2 is a top view of the apparatus of FIG. 1.

FIG. 2 illustrates the top view of the apparatus of FIG. 1 in which the heads 20 of four guide pins 16 may be seen in the top of the punch plate 4.

Figure 3:
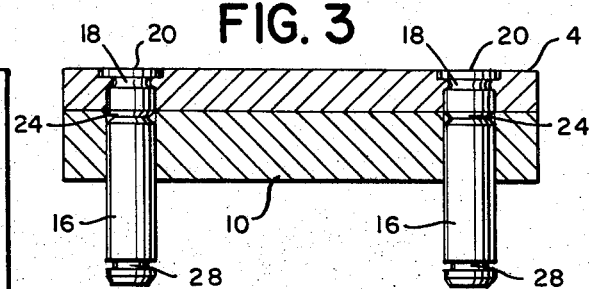
FIG. 3 is a partial cross-sectional view of one step of assembling the die in proper alignment.

Turning now to FIGS. 3–5 the method of assembly of the die set will be described. The guide pin openings 12 are first formed in the prehardened steel die plate 10. It should be noted that the die plate is a single piece and that the cutting die section may be formed in the die plate 10 either before or after the die set is assembled.

The position of the opening in the punch plate may be determined by placing the punch and die plates 4 and 10 together, transferring the position of the die plate opening to the punch plate and then forming an opening at the marked punch plate position.

Figures 4A, 4B:
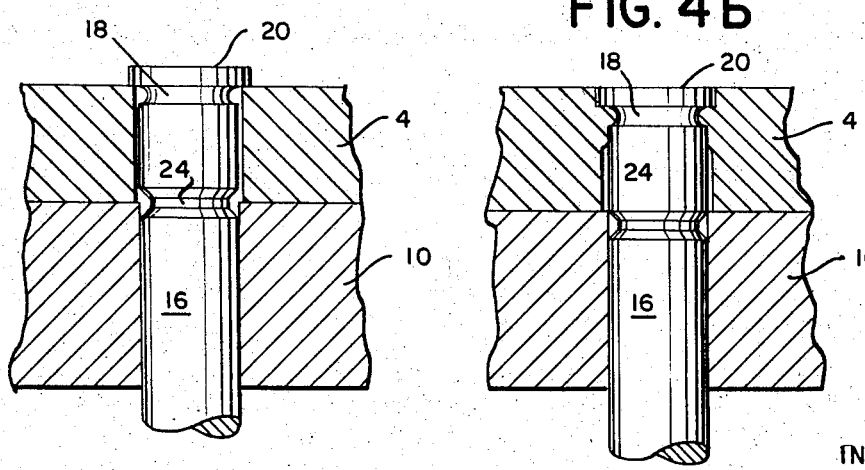
FIG. 4a is a partial cross-sectional view of the aligned guide pin before securing to the punch plate.
FIG. 4b is a partial cross-sectional view of the aligned guide pin after being secured to the punch plate by material being displaced into the undercut collar.

FIGS. 3 and 4 illustrate the initial alignment of the guide pins 16 in the punch plate 4. FIG. 4a shows the head 20 resting on the punch plate 4 and being positionally aligned by the die plate 10.

Upon the application of pressure to the guide pin head 20 the guide pin moves down, displacing and distorting punch plate material which flows into the undercut collar 18 to secure the guide pin to the punch plate in a properly aligned position, as illustrated in FIG. 4b. It should be noted that the opening in the punch plate 4 is slightly larger than the opening in the die plate 10 so the guide pin floats before pressure is applied and can move to align properly when pressure is applied.

FIGS. 5a–c demonstrate the additional securing of the guide pins 16 to the punch plate 4 by the distortion of a malleable holding material 22 into the punch plate groove 24. The method of applying a force to distort the material 22, as shown in FIG. 5 is that a device 30 is placed to surround the guide pin 16. When pressure is applied to force the plates 4 and 10 together the device 30 forces material 22 into the punch plate groove 24 to secure the guide pin 16 to the punch plate 4. The arcurate surface 32 aids in forming the material 22 to establish a secure bond.

It should be noted that most conventional dies have the guide pins secured to the die plate while in the present case the prehardened steel one-piece die plate acts to guide the punch plate secured guide pins whose alignment position was established by the openings in the prehardened die plate. Such an arrangement allows the die set to be assembled with the cutting die section to be formed in the die plate at a later time without the need for heat treating the die plate. Heat treating a die plate, not prehardened, would destroy the die set alignment by movement of the punch plate guide pin openings.

To review part of the invention it may been seen from the foregoing that a method of constructing a die set has been described having parallel punch and die plates aligned by guide pins in which the following steps are followed: forming a die block of prehardened steel with openings to receive guide pins; abutting the punch and die plates, marking the punch plate at the points corresponding to the positions of the die plate having guide pin openings; forming guide pin openings in the punch plate at the marked points; placing guide pins having a head, an undercut collar, punch plate groove and end groove through the aligned, abutting punch and die plates; applying pressure to the heads of the guide pins to displace metal from the punch plate into the undercut collar; removing the die plate from the punch plate; placing malleable rings in the punch plate groove of the guide pin; applying pressure to the rings to force the ring material into the punch plate groove to secure the guide pin in the punch plate by material in both the undercut collar and the punch plate groove; assembling the die set by inserting the punch plate connected guide pins in the die plate openings and inserting lock rings in the end groove of each guide pin to prevent separation of the die plate from the punch plate; forming a cutting die section in the die plate; aligning a punch with the cutting die section; and securing the punch to the punch plate.

In a variation of the above method the cutting die section is formed in the die plate after locating the guide pin openings but prior to aligning and securing the guide pins in the plates.

More specifically this method is directed to forming a die comprising machining two plates, transferring the guide pin opening position from one plate to the other, forming guide pin openings in accordance with the transferred opening positions, machining a cutting die section in the die plate, aligning the guide pins to one of the two plates, and aligning the blanking punch with the die.

A prehardened steel, for use as cutting die members, may be defined as having a hardness and wearability to resist deformation during a stamping operation and yet is soft enough to allow machining by high speed steel cutting tools.

As herein described the invention achieves the objects as set forth. It should be understood that variations of the invention may be visualized without departing from the spirit of the invention.

What is claimed is:

1. The method of forming a die comprising, forming guide pin openings in a punch plate and a steel die plate, assembling the die set by securing guide pins to one of the plates so they guide in the other plate, machining a die section in the die plate after the die has been assembled, and mounting and securing the punch in proper registration with the die.

2. The method of claim 1 wherein forming of the guide pin openings occurs in a prehardened steel die plate.

3. The method of constructing a die set having parallel punch and die plates aligned by guide pins comprising forming a die plate of prehardened steel with openings to receive guide pins formed therein, abutting the punch and die plates, marking the punch plate at the points corresponding to the positions of the die plate having guide pin openings, forming guide pin openings in the punch plate at the marked points, placing guide pins having a head, an under cut collar, punch plate groove and end groove through the aligned, abutting punch and die plates, applying pressure to the heads of the guide pins to displace metal from the punch plate into the under cut collar, removing the die plate from the punch plate, placing malleable rings in the punch plate groove of the guide pin, applying pressure to the rings to force the ring material into the punch plate groove to thereby secure the guide pin in the punch plate by material in both the undercut collar and the punch plate groove, and assembling the die set by inserting the punch plate connected guide pins in the die plate openings and inserting lock rings in the end groove of each guide pin to prevent separation of the die plate from the punch plate, machining a die section in the die plate after the die has been assembled, and mounting and securing a punch in proper registration with the die.

4. A method of manufacturing a punch and die set comprising the steps of forming guide pin openings in a first plate and in a second plate, securing guide pins to one of the plates while guiding within the guide pin openings in the second plate, assembling the set so that said pins are movable within and guidable by the guide pin openings formed directly in the second plate, machining a die directly in the second plate after assembling the set, and mounting and securing a punch member to the first plate in proper registration with the die thus machined.

References Cited

UNITED STATES PATENTS

| | | | |
|---|---|---|---|
| 2,245,676 | 6/1941 | Johnson | 83—698 X |
| 2,431,566 | 11/1947 | Kopczynski | 83—698 X |
| 2,434,702 | 1/1948 | Kopczynski | 83—146 |
| 2,445,574 | 7/1948 | Grunow | 83—637 |
| 2,974,967 | 3/1961 | Felmet | 83—698 X |
| 3,086,418 | 4/1963 | Levine | 83—637 X |
| 3,151,504 | 10/1964 | Pare et al. | 76—107 |
| 3,186,284 | 6/1965 | Bennett | 83—698 X |
| 3,228,262 | 1/1966 | Bennett | 76—107 |

WILLIAM S. LAWSON, *Primary Examiner.*